H. BLACKMER, W. RINGER & D. VAN OSTRAND.
Hoisting-Machine.
No. 197,450. Patented Nov. 27, 1877.
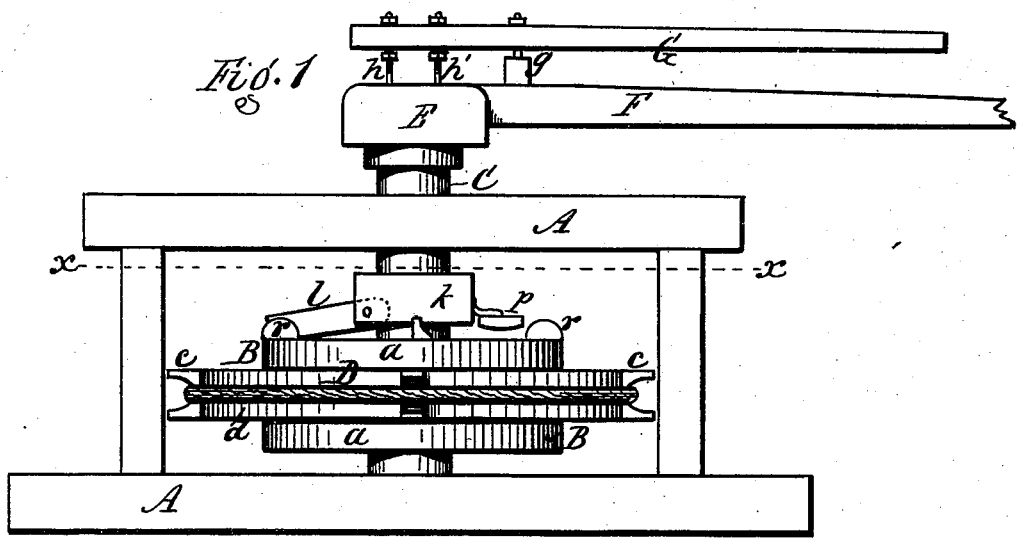
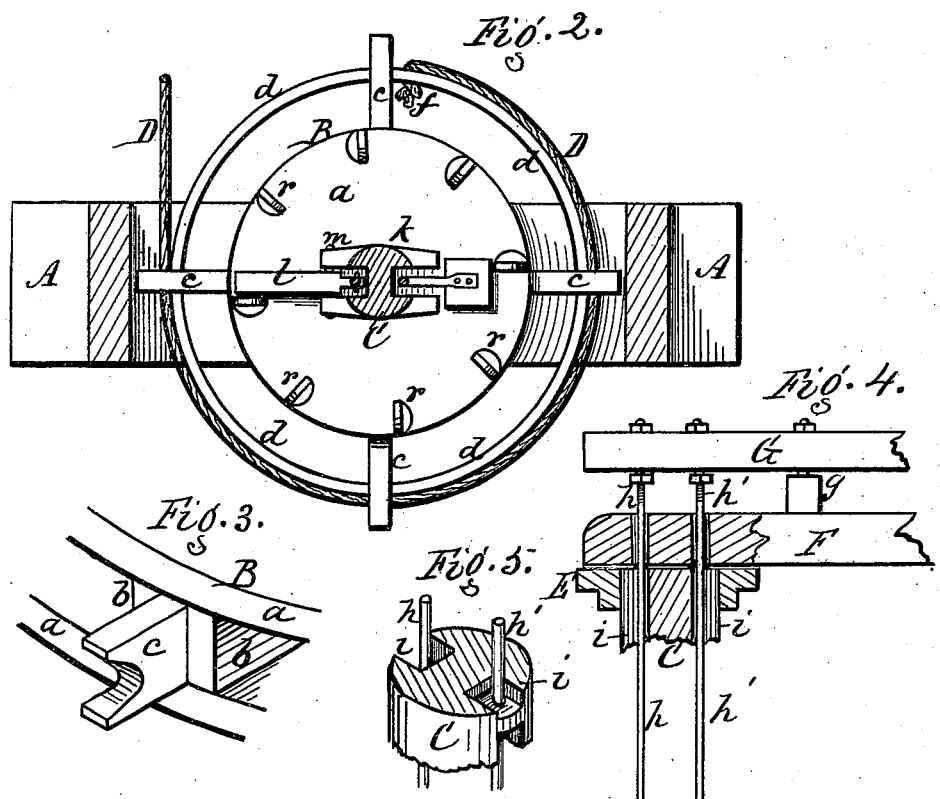
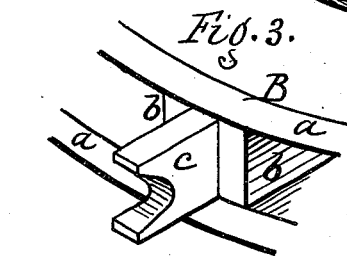
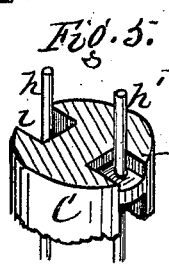

UNITED STATES PATENT OFFICE.

HENRY BLACKMER, OF SENECA CASTLE, AND WILLIAM RINGER AND DAVID VAN OSTRAND, OF GENEVA, NEW YORK.

IMPROVEMENT IN HOISTING-MACHINES.

Specification forming part of Letters Patent No. 197,450, dated November 27, 1877; application filed May 18, 1877.

*To all whom it may concern:*

Be it known that we, HENRY BLACKMER, of Seneca Castle, in the county of Ontario and State of New York, and WILLIAM RINGER and DAVID VAN OSTRAND, both of Geneva, in the county of Ontario and State aforesaid, have invented a certain new and useful Improvement in Hoisting-Machines; and we do hereby declare that the following is a full, clear, and exact description of the construction and operation of the same, reference being had to the accompanying drawings, in which—

Figure 1 is a side elevation of our improved machine. Fig. 2 is a horizontal section in line $x\ x$ of Fig. 1, looking downward. Fig. 3 is a perspective view of a portion of the winding-drum. Fig. 4 is a sectional elevation of the pawl and brake and their connecting parts, and Fig. 5 is a perspective view of a fragment of the shaft of the winding-drum.

Our improvement is in the nature of a horse-power having a winding-drum, upon which winds a rope or cord, by which the load is hoisted. It is applicable to various uses, but is specially adapted to raising hay from the load and depositing it in the mow.

The invention consists in the construction and arrangement of parts, hereinafter more fully described and definitely claimed.

A represents a frame, of wood, of the form shown, which is securely staked to the ground and stayed by braces. B is a winding-drum, secured to a shaft, C, mounted in the frame. The lower end of the shaft rests in a step, while the upper end rests in a socket in the top of the frame.

The drum consists of two disks, $a\ a$, of iron, separated by blocks $b\ b$, Fig. 3, and from the latter project arms $c\ c$, forming sprockets, notched at their outer end, in which runs the winding-cord D.

$d\ d$ are rims or segments, secured between the arms at some distance from the disks, and forming an entire circle, on which winds the cord, as shown. The cord is made fast at one end to the drum, as shown at $f$, and the other end is carried around pulleys to any desired point where the load is to be raised. In the case of unloading hay it is carried into the barn, and passed over a pulley at suitable height, and a fork attached to its end. To enable the horse to pass over the cord-bridges are used for the cord to pass under.

E is a box, bolted fast to the upper end of the shaft. F is the sweep, bolted fast in the box. The horse is attached to the sweep in the ordinary way. G is a lever, pivoted or hinged at $g$ to a block resting on top of the sweep. $h\ h'$ are two rods attached to the rear end of the lever, as shown. The attachment is preferably made by nuts turning on the threaded ends of the rods. These rods extend down through slots $i\ i$, formed in the sides of the shaft, as shown in Fig. 5, being stayed or kept in position vertically by bearings in the said slots, as also shown in Fig. 5.

$k$ is a bearing of the shaft just above the top of the winding-drum, and formed with forks corresponding in position with the slots in the shaft. $l$ is a pawl, pivoted in this bearing at $m$, and having a projection, $n$, extending back of the pivot, to which is jointed the lower end of rod $h$. $p$ is a shoe, forming a brake upon the opposite side, to which is attached the lower end of the other rod, $h'$. The end of the rod is bent outward, as shown, so as to bring the brake outside of the bearing $k$.

$r\ r$ are a series of projections on top the winding-drum, forming ratchet-teeth, with which engages the pawl $l$. The back sides of these projections are preferably made inclined, as shown.

The operation is as follows: The load being connected with the fork at the end of the cord, motion is given to the drum by means of the sweep, which winds the cord up and elevates the load.

The connection between the shaft C and drum B is made by the pawl $l$, which drops behind the projections $r\ r$. When the load is to be dumped the lever G is raised, which throws the rods $h\ h'$ down, thereby raising the pawl $l$ from its contact with the drum, and allowing the latter to run back. The same movement throws the brake $p$ down in contact with the top of the drum, and applies friction to prevent the drum from revolving too rapidly under the weight of the load.

It will be seen that the action of the pawl and brake is automatic—one rising as the ther falls, and vice versa—the whole produced by a single movement of the lever G. By this means the drum is perfectly under control. In the use of this machine no backing of the horse is required.

Two of the levers G G might be used instead of one. In such case one would connect with the brake and the other with the pawl, and the slots *i i* for the rods to run in would be located on the sides instead of the front and rear of the shaft; but the single lever first described preferable.

The apparatus above described is applicable to many uses besides elevating hay.

Having thus described our invention, what we claim herein as new is—

1. In a hoisting-machine, the combination, with the drum B, of the lever G, rods *h h'*, pawl *l*, and brake *p*, arranged as herein described, so that the pawl and brake receive simultaneous motion in opposite directions by the action of the lever, as and for the purpose specified.

2. In a hoisting-machine such as described, the combination, with the lever G and rods *h h'*, provided with the pawl *l* and brake *p*, of the slots *i i* in the shaft C of the winding-drum B for the passage of said rods, as shown and described.

In witness whereof we have hereunto signed our names in the presence of two subscribing witnesses.

HENRY BLACKMER.
    WM. RINGER.
    DAVID VAN OSTRAND.

Witnesses:
    JOHN VAN OSTRAND,
    S. SOUTHWORTH.